US010509777B2

(12) United States Patent
Ivanov et al.

(10) Patent No.: US 10,509,777 B2
(45) Date of Patent: Dec. 17, 2019

(54) EXHAUSTIVE PLACES FETCHING

(71) Applicant: Facebook, Inc., Menlo Park, CA (US)

(72) Inventors: Ivan Vladimirov Ivanov, London (GB); Marian Gelu Olteanu, Queens, NY (US); Pol Mauri Ruiz, Redwood City, CA (US); Victor-Cristian Ionescu, London (GB)

(73) Assignee: Facebook, Inc., Menlo Park, CA (US)

( * ) Notice: Subject to any disclaimer, the term of this patent is extended or adjusted under 35 U.S.C. 154(b) by 441 days.

(21) Appl. No.: 15/389,366

(22) Filed: Dec. 22, 2016

(65) Prior Publication Data

US 2018/0183871 A1    Jun. 28, 2018

(51) Int. Cl.
*G06F 15/16* (2006.01)
*G06F 16/22* (2019.01)
*H04L 29/08* (2006.01)
*G06F 16/29* (2019.01)

(52) U.S. Cl.
CPC .............. *G06F 16/22* (2019.01); *G06F 16/29* (2019.01); *H04L 67/20* (2013.01)

(58) Field of Classification Search
None
See application file for complete search history.

(56) References Cited

U.S. PATENT DOCUMENTS

| 9,812,011 | B1* | 11/2017 | Stenneth | G08G 1/0967 |
| 2009/0005968 | A1* | 1/2009 | Vengroff | G06F 16/9537 |
| | | | | 701/425 |
| 2012/0270563 | A1* | 10/2012 | Sayed | H04W 4/12 |
| | | | | 455/456.3 |
| 2013/0147846 | A1* | 6/2013 | Kalai | G06T 1/60 |
| | | | | 345/660 |
| 2015/0019294 | A1* | 1/2015 | Milton | G06Q 30/0205 |
| | | | | 705/7.34 |
| 2016/0080438 | A1* | 3/2016 | Liang | G06F 3/04812 |
| | | | | 715/753 |
| 2017/0067748 | A1* | 3/2017 | Glover | G01C 21/20 |
| 2017/0091993 | A1* | 3/2017 | Andrew | G06F 3/04812 |
| 2017/0235733 | A1* | 8/2017 | Florance | G06F 16/29 |
| | | | | 707/765 |
| 2018/0113880 | A1* | 4/2018 | Metcalf-Putnam | |
| | | | | G01C 21/3691 |

\* cited by examiner

*Primary Examiner* — Brian Whipple
*Assistant Examiner* — Gregory P Tolchinsky
(74) *Attorney, Agent, or Firm* — Baker Botts L.L.P.

(57) ABSTRACT

In one embodiment, a method includes identifying and recursively populating a geographic tile with entities. Recursively populating a geographic tile with entities includes: sending a request to a third-party server for entities located near a representative point of the geographic tile; calculating a maximum distance from the representative point among the entities received; and determining whether a bounding perimeter based on the maximum distance encompasses the geographic tile. If the bounding perimeter encompasses the geographic tile, the retrieved entities located within the geographic tile are stored in association with an identifier for the geographic tile. If the bounding perimeter does not encompass the geographic tile, the geographic tile is divided and the subdivision tiles are recursively populated.

20 Claims, 12 Drawing Sheets

EXHAUSTIVE PLACES FETCHING

TECHNICAL FIELD

This disclosure generally relates to mapping services.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

Particular embodiments may exhaustively populate a geographic tile with entities using information retrieved from third-party servers. Particular embodiments may identify a geographic tile to populate with entities. The geographic tile may be described by geographic coordinates. The geographic coordinates may comprise at least two pairs of latitude and longitude coordinates. Particular embodiments may recursively populate the geographic tile. Recursively populating the geographic tile may include calculating a center point of the geographic tile and requesting information about entities from one or more third-party servers relative to that center point. The information retrieved may include location information. Particular embodiments may calculate the distance between each entity received and the center point. Particular embodiments may determine a bounding perimeter around the center point using the distance from the center point to the farthest of the entities. Particular embodiments may determine whether the bounding perimeter encompasses the geographic tile. If the bounding perimeter encompasses the geographic tile, the information retrieved about each entity located within the geographic tile may be stored in association with the tile and the operation terminated. If the bounding perimeter does not encompass the tile, particular embodiments may divide the geographic tile into a plurality of subdivision tiles and recursively populate each subdivision tile. By populating the geographic tile, particular embodiments enable a powerful way to transform information from third-party servers into a format suitable for use for other operations.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
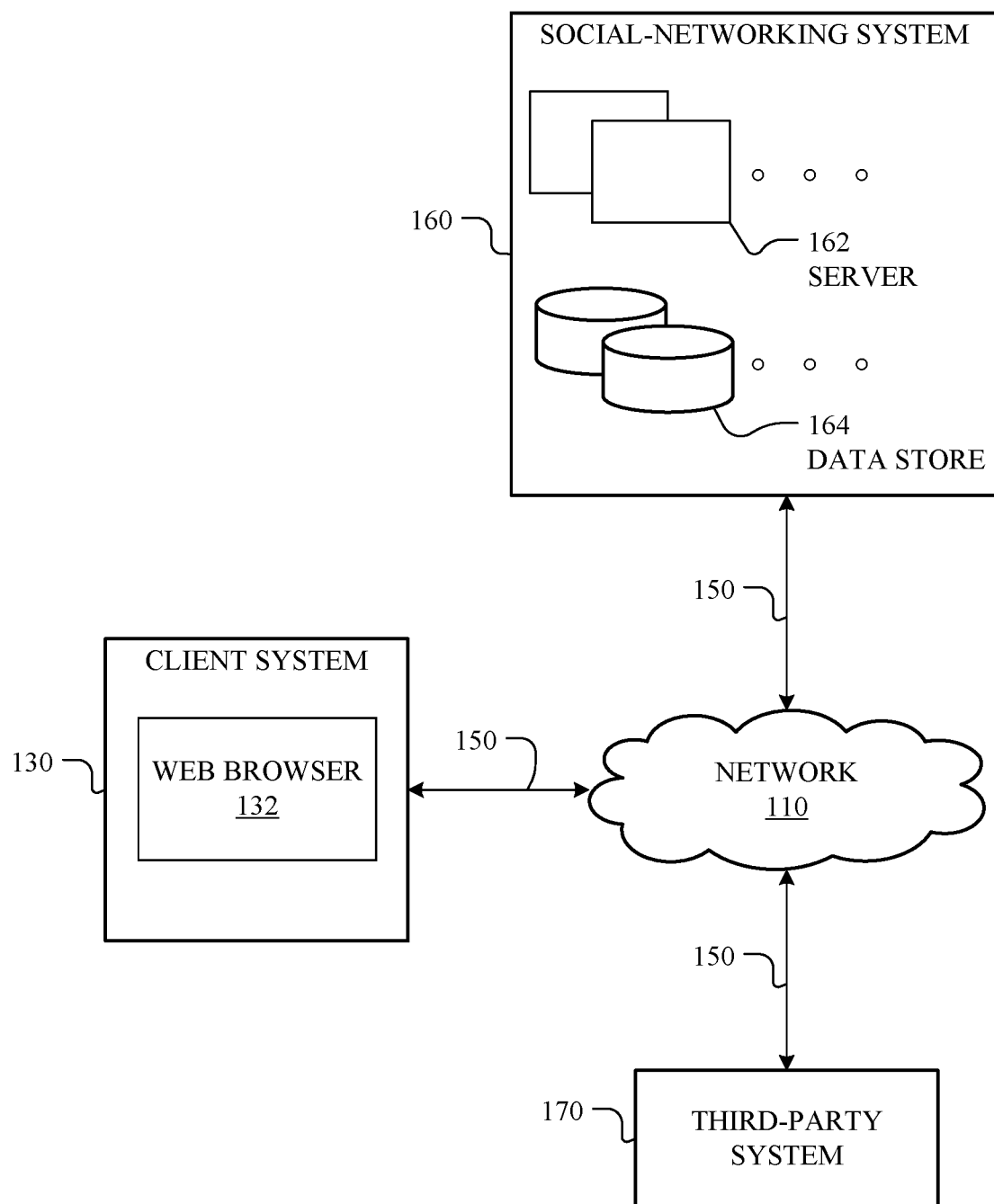
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
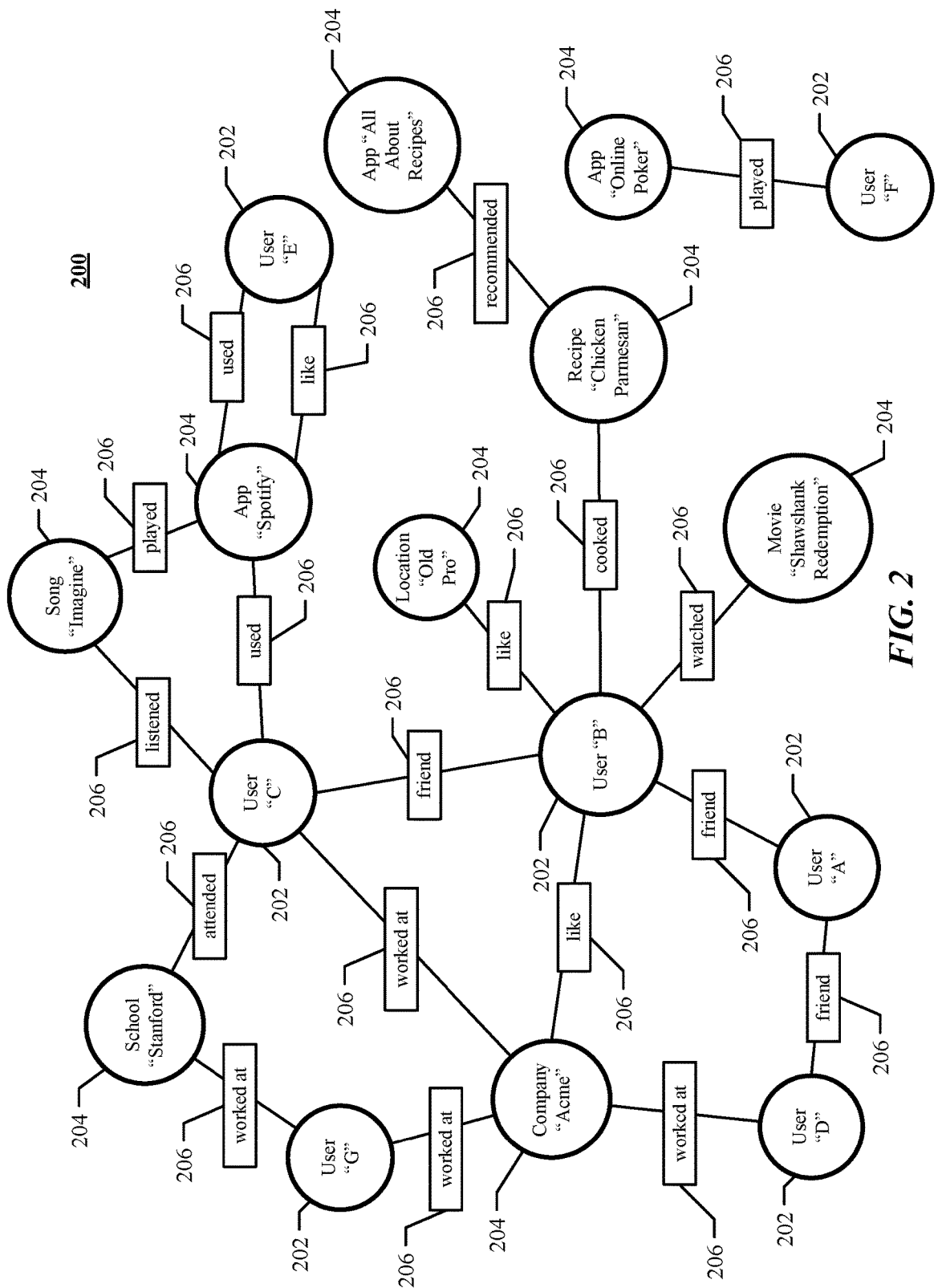
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 3:
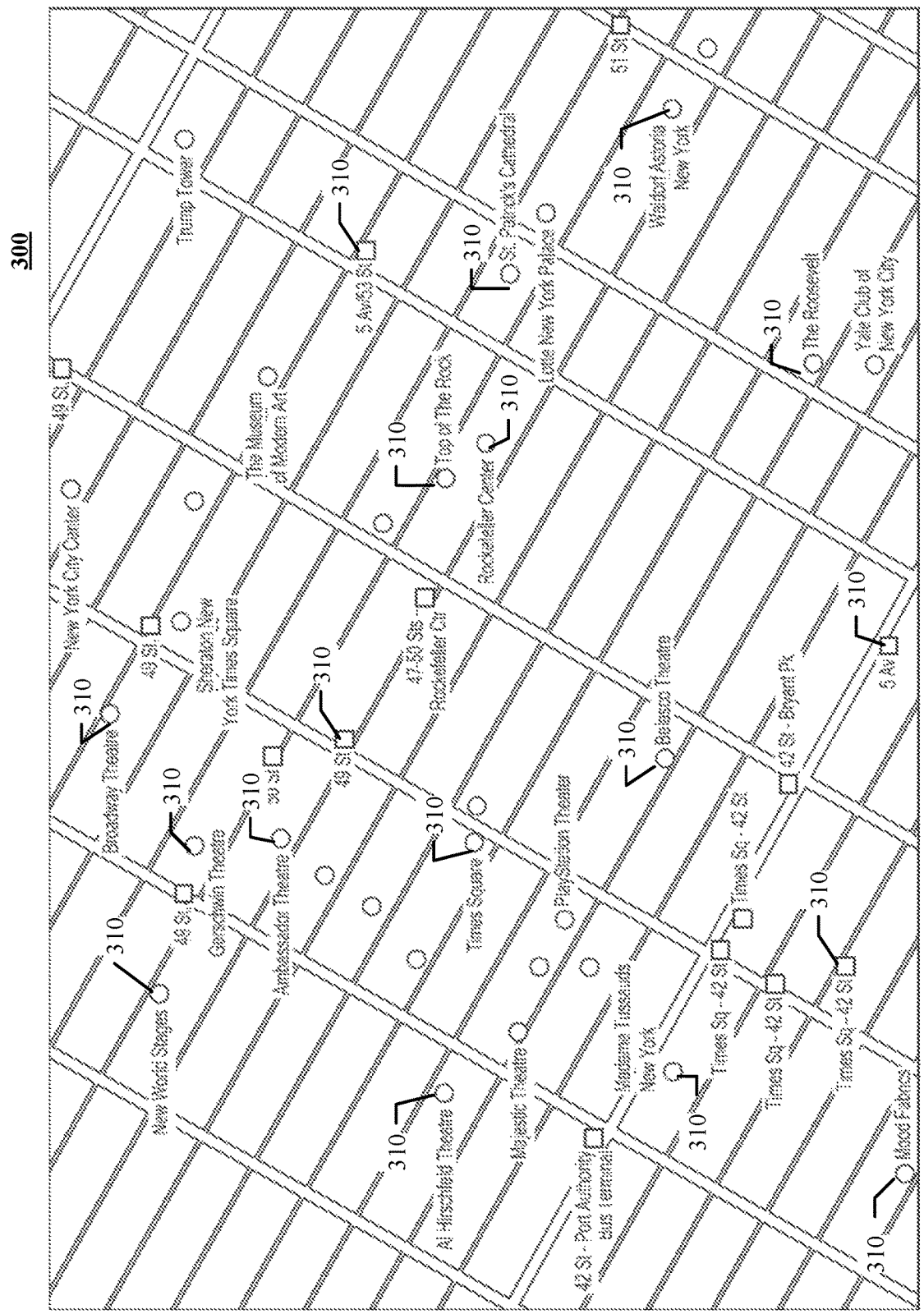
FIG. 3 illustrates an example map of a downtown area.

FIG. 3 illustrates a map 300 of a downtown area described by the latitude and longitude coordinates (40.7641015, −73.992178), (40.754074, −73.992290). The map includes points of interest 310 such as public transit stops, theatres, hotels, other businesses, and landmarks.

Figure 4:
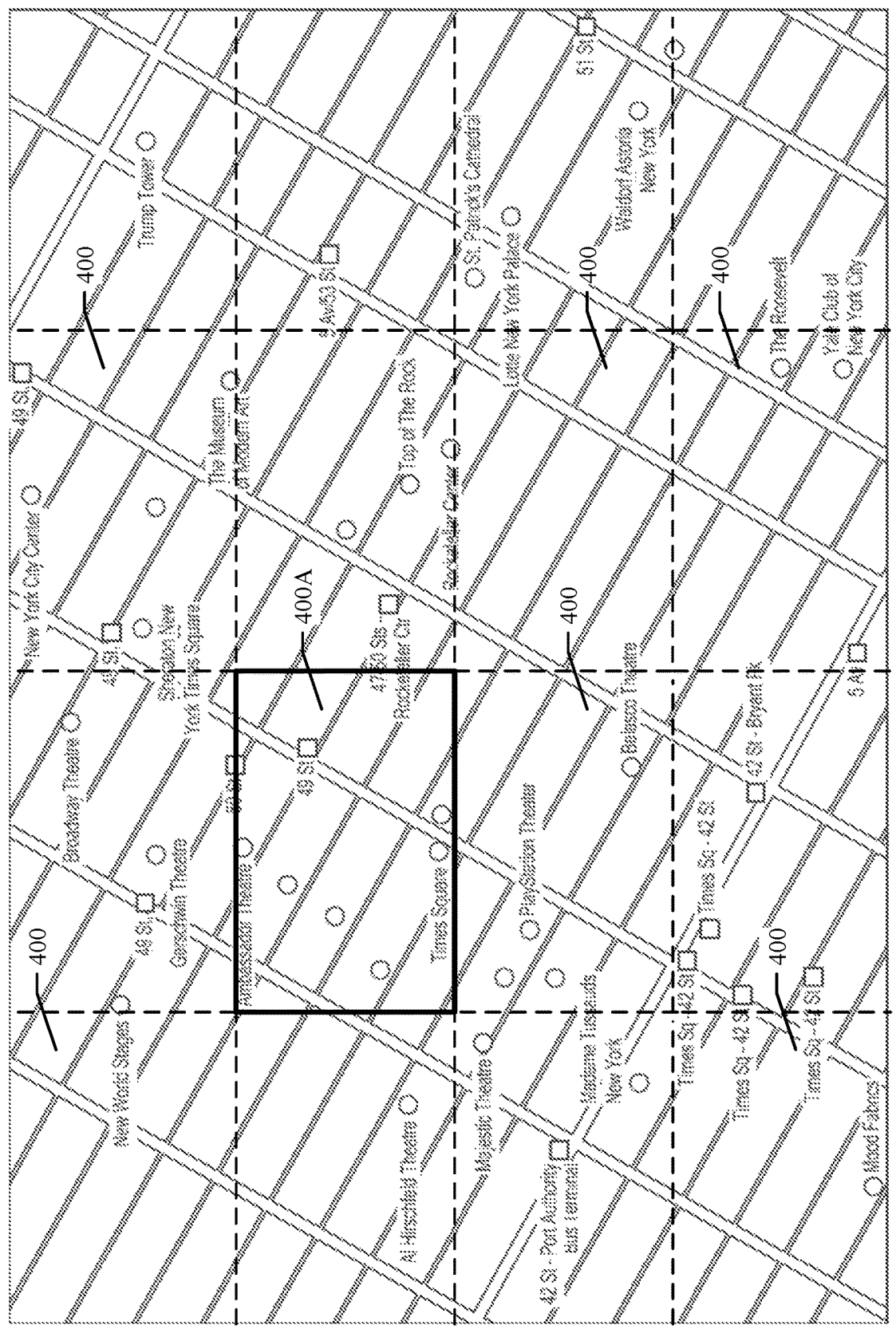
FIG. 4 illustrates the example map of FIG. 3 divided into a plurality of tiles.

FIG. 4 illustrates the map 300 of FIG. 3 divided into a plurality of rectangular geographic tiles 400. As used herein, a geographic tile refers to a section of a map that has been divided into regular polygons to enable the efficient processing of the map. In particular embodiments, a geographic tile 400 may be a square, rectangle, hexagon, triangle, or any other polygon capable of being laid out in a contiguous manner to cover a two-dimensional surface. Geographic tiles 400 may be represented by the location information associated with the tile. The location information may comprise pairs of latitude and longitude coordinates. In particular embodiments the location information may comprise a pair of latitude and longitude coordinates for each corner of the tile. As an example and not by way of limitation, a square or rectangular tile may be described by four pairs of latitude and longitude coordinates, while a triangle may be described by three pairs of coordinates. As another example and not by way of limitation, a square or rectangle may be described by two pairs of latitude and longitude coordinates. Particular embodiments may be configured to identify a geographic tile 400A to populate with entities. The identified geographic tile 400A is described by the coordinates (40.761487, −73.988657), (40.761487, −73.988171). Geographic tiles 400 may also contain other associated information relating to shape such as the edges or area of the tile. The identified geographic tile 400A may be identified by a user or by other processors as needed. Although this disclosure describes and illustrates identifying a geographic tile in a particular manner, this disclosure contemplates any suitable method for identifying a geographic tile.

Figure 5:
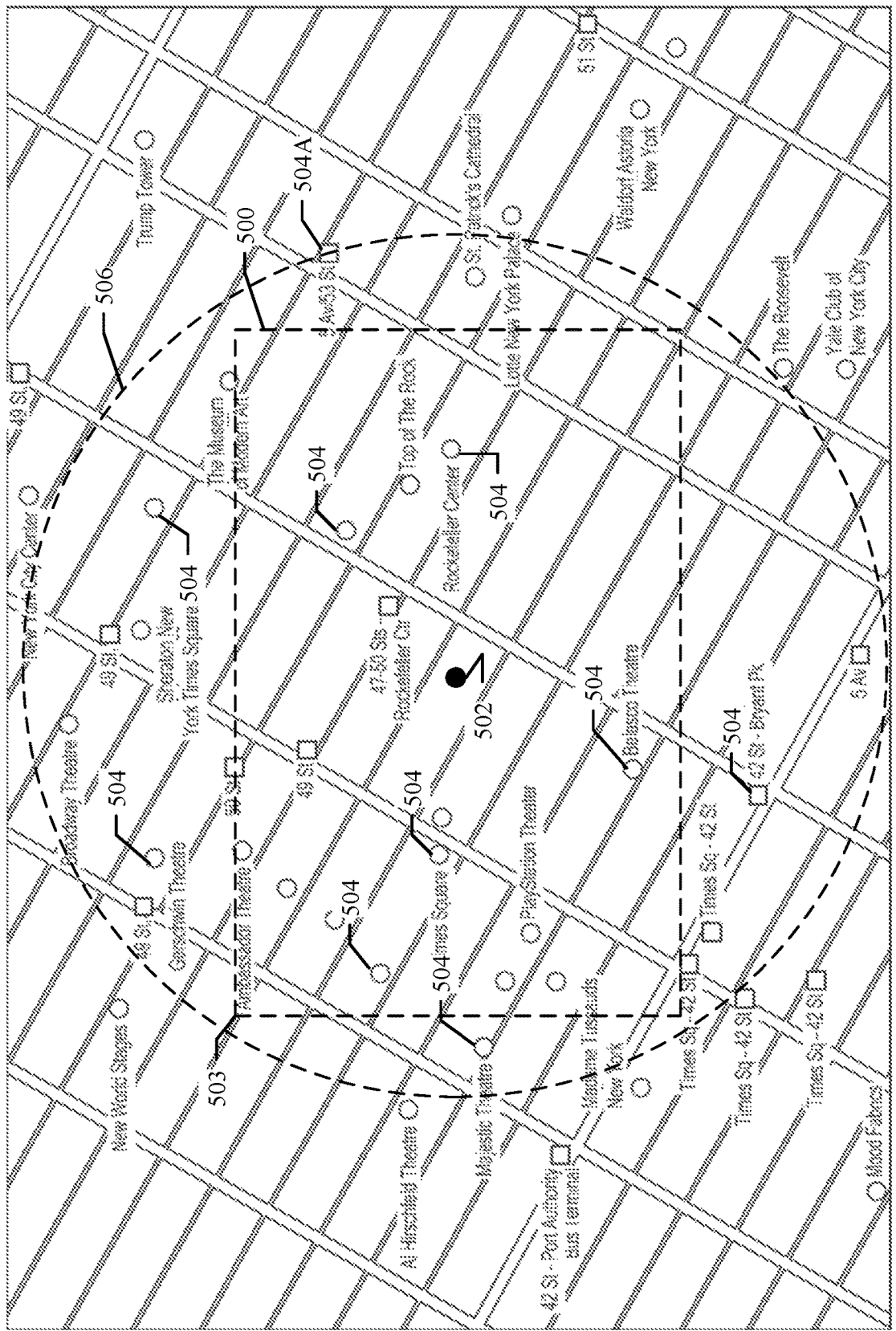
FIG. 5 illustrates an example set of mapped entities within a specified radius of a point on the map of FIG. 4.

FIG. 5 illustrates a geographic tile 500 on the map 300 of FIG. 3. The geographic tile 500 is described by the coordinates (40.761487, −73.988657), (40.7566016, −73.976731). Particular embodiments may be configured to populate an identified geographic tile 500. Particular embodiments may begin populating by identifying a particular reference point (e.g., the center point) associated with the geographic tile 500. A center point 502 may be associated with the geographic tile 500 prior to identification or may be calculated based on location information associated with the geographic tile 500. Although this disclosure describes and illustrates identifying a geographic tile reference point in a particular manner, this disclosure contemplates any suitable method for identifying a geographic tile reference point.

Particular embodiments may send a request to one or more third-party servers for entities located near the center point 502. The third-party servers may be configured to store and return information regarding various subjects including, but not limited to, restaurants, hotels, schools, churches, geological surveys, crime locations or hot spots, census data, public transportation, public parking, advertising, landmarks, statues, animal habitats or activities, retail or shopping centers, other businesses, or any other subject which may contain information that can be displayed on a map. As an example and not by way of limitation, an entity may be a store, restaurant or other business, landmark, bus stop, train or subway station, parking spot, geocache, event, designated point of interest, topological feature, data visualization, or anything else capable of representation on a map in association with a location that may be cataloged by a computer server. Particular embodiments may request particular entity information or entity information from particular third-party servers based on a variety of input factors. As an example and not by way of limitation, these input factors may include advertising concerns, information from a social graph, user input, emergency conditions, determination of relevance to user request, or any other suitable factors. Returning to FIG. 5, a variety of entities 504 have been retrieved as responses from a third-party server. The third-party servers may respond to the request with a set of entities 504 and their associated information. As an example and not by way of limitation, the entity information may include an identifier, such as a name, serial number, or unique identification number or phrase. The entity information may also include location information. As an example and not by way of limitation, the location information may comprise one or more pairs of latitude and longitude coordinates, a street address, or information based on another reliable method of locating objects. Although this disclosure describes and illustrates requesting entity information from a third-party system in a particular manner, this disclosure contemplates any suitable method for requesting entity information from a third-party system.

In particular embodiments, the location information for each entity 504 may comprise more than one pair of latitude and longitude coordinates, more than one street address, or more than one set of information based on another reliable method of locating objects. In some embodiments, the location information may include multiple locations for entities with the same name or identifier, such as the various locations of a chain restaurant. In some embodiments, the location information may include multiple points to designate a large entity, such as a park or large building complex. Particular embodiments may be configured to determine from these multiple points a single point to represent the entity 504. As an example, and not by way of limitation particular embodiments may determine a single entity location using: the average of the location points; the median of the location points; the closest of the location points to the center point of the geographic tile; a random selection of the location points; a selection based on the location of pedestrian entrances or garage entrances; a selection based on associated landmarks or points of interest; or any other suitable method for determining a single point to use given a plurality of candidate points.

In particular embodiments, the response from a third-party server may take on a plurality of forms. In some embodiments, the third-party server may be configured to return a "Nearest Within" response. In a Nearest Within response, the response from a third-party server may include all entities stored by the third-party server that are within a given radius of a specified point. As an example, the response may include all entities within one hundred meters of the specified point. Multiple Nearest Within responses may contain a variable number of items within a fixed range. In some embodiments, the third-party server may be configured to return a "Nearest K" response. In a Nearest K response, the response from a third-party server may include the nearest entities to a specified point up to a particular count. As an example, the response may include the twenty five closest entities to the specified point. Multiple Nearest K responses may contain a fixed number of entities within variable ranges. In particular embodiments, the type of response a third-party server is configured to provide may not be known at the time of making the request. In particular embodiments, the third-party server may make available information regarding the type of response that a requester may anticipate receiving.

In particular embodiments, entities 504 received as a response from a third-party server may be used to calculate the distance between the entity and the center point 502. The distances may be compared and the distance corresponding to the entity 504A farthest from the center point 502 may be designated the maximum distance. A bounding perimeter 506 may be calculated using the maximum distance. In particular embodiments, the bounding perimeter 506 may be calculated as the perimeter of a variety of geometric shapes. In particular embodiments, the bounding perimeter 506 may be calculated as the perimeter of a circle with the center point 502 of the geographic tile 500 as the center point of the circle and the maximum distance as the radius of the circle. Although this disclosure describes and illustrates determining a bounding perimeter in a particular manner, this disclosure contemplates any suitable method for determining a bounding perimeter.

After calculating the maximum distance and bounding perimeter 506, particular embodiments may determine whether the bounding perimeter 506 encompasses the geographic tile 500. As an example and not by way of limitation, particular embodiments may determine whether the bounding perimeter 506 encompasses the geographic tile 500 by comparing the maximum distance to the distance from the center point 502 of the geographic tile to a corner 503 of the geographic tile. If the maximum distance is equal to or greater than the distance from the center point 502 to a corner 503 of the geographic tile 500 it may be assumed that all entities 504 available to the third-party server that may be located within the geographic tile 500 have been retrieved as a request from the third-party server. In particular embodiments, this determination may be made using the additional information associated with the geographic tile. As an example and not by way of limitation, particular embodiments may determine which entities are located within the geographic tile by comparing the location information, such as latitude and longitude coordinates, for each entity with the location information describing the geographic tile. This disclosure contemplates any suitable method for determining whether an entity is located within a geographic tile. Particular embodiments may store the entities 504 located within the geographic tile 500 with an identifier for the geographic tile 500 and terminate the operation.

Figure 6A:
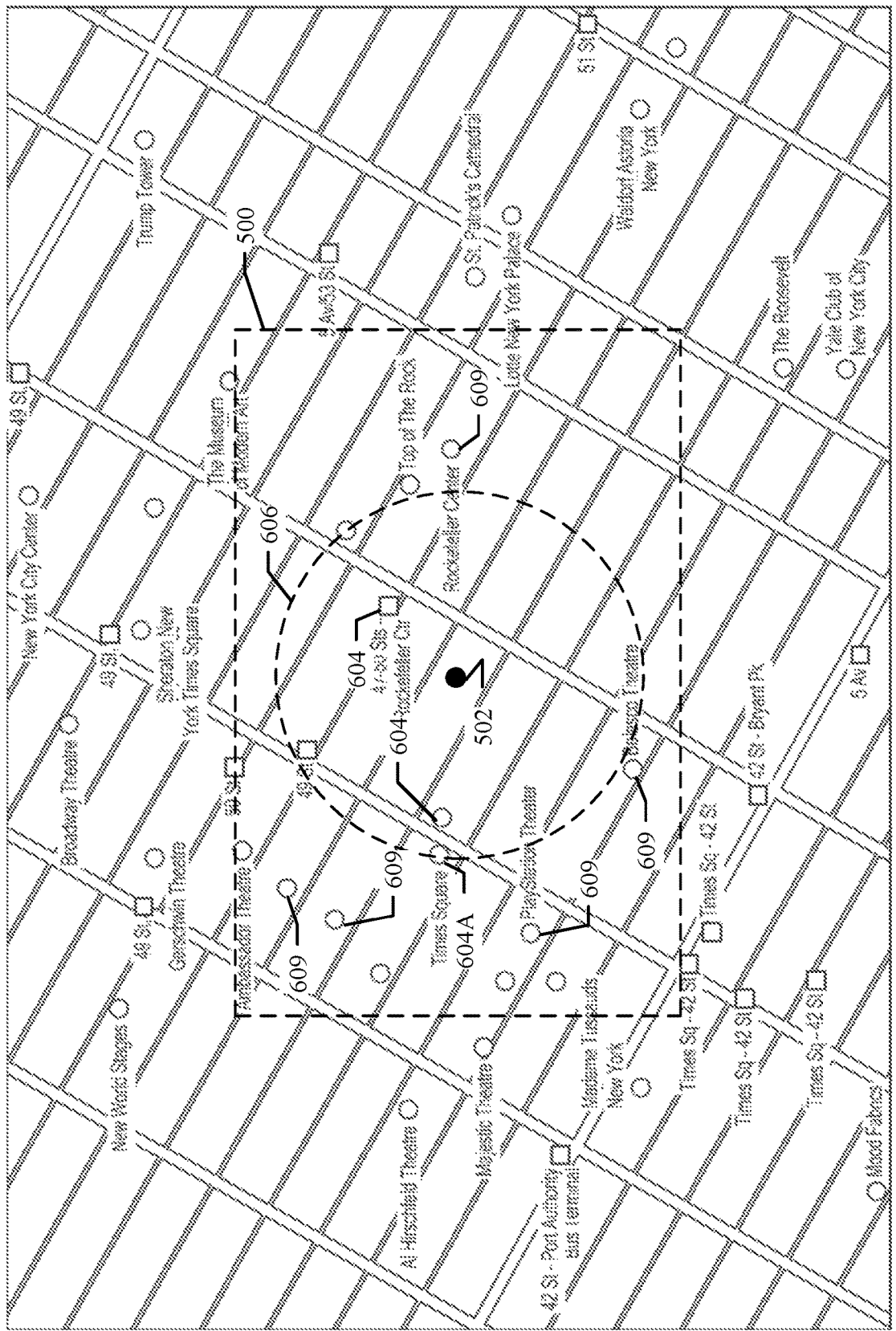
FIGS. 6A-6C illustrate an example set of mapped entities within a specified radius of a point on the map of FIG. 4.
Figure 6B:
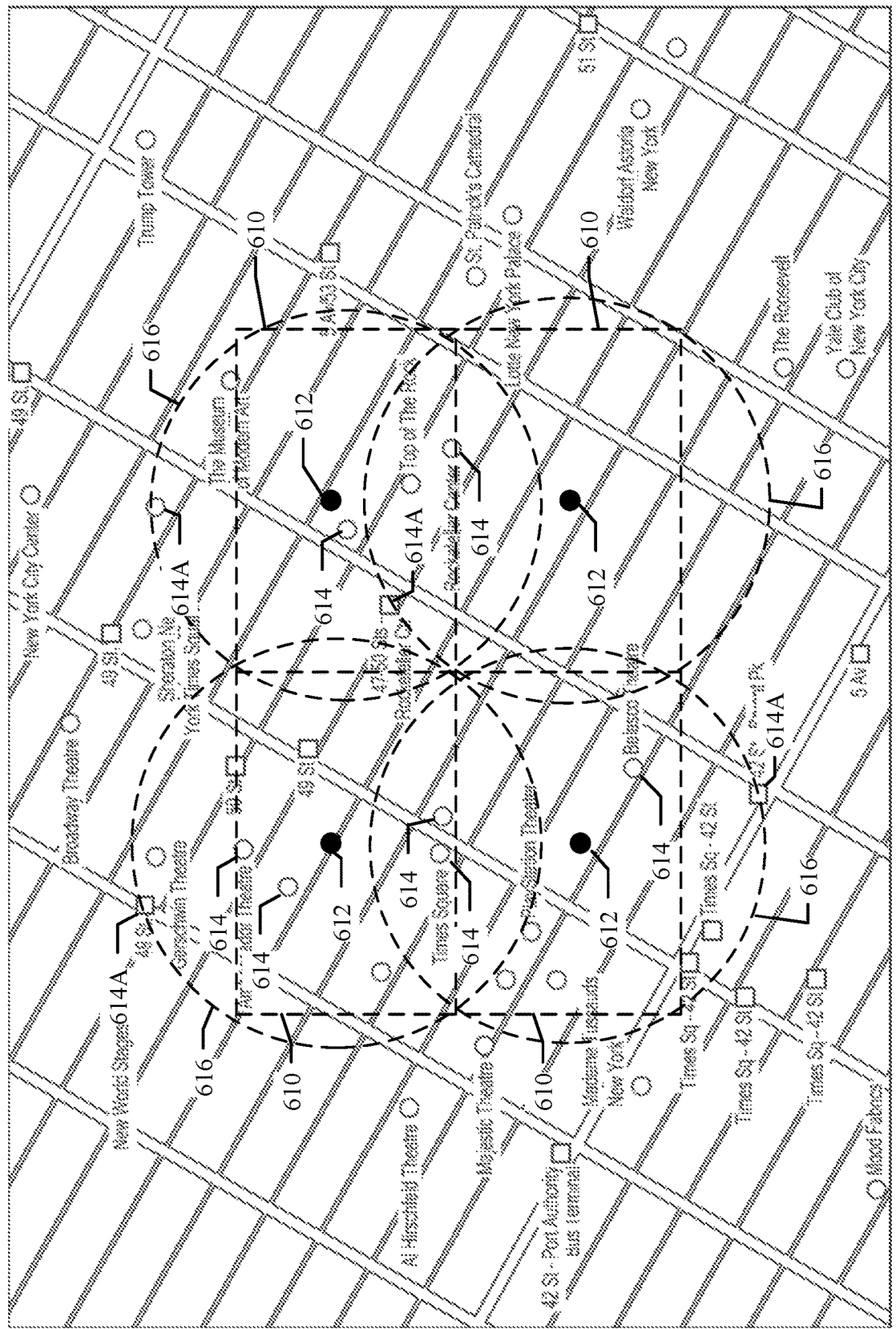
Figure 6C:
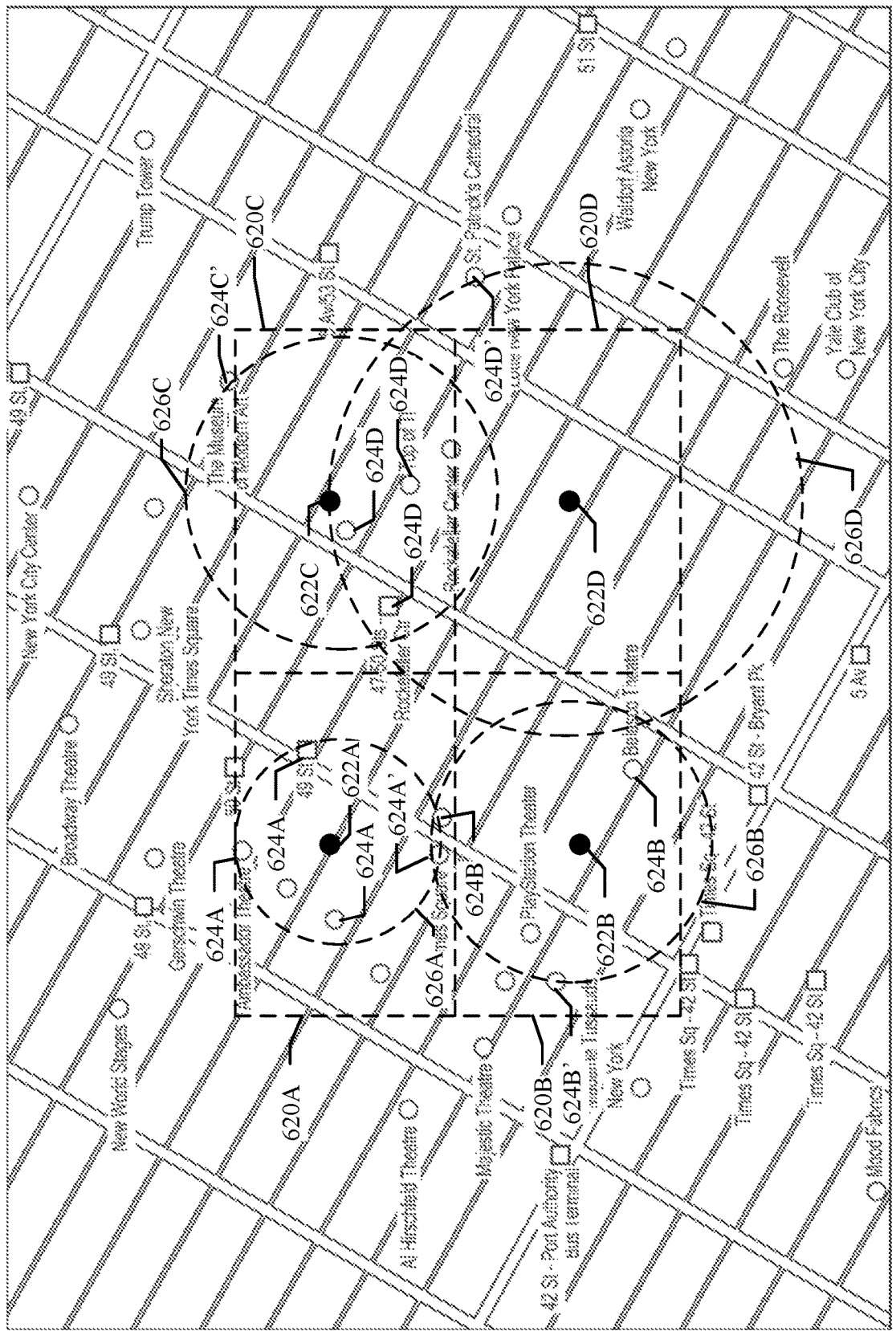

FIGS. 6A-6C illustrate a scenario wherein the geographic tile is not encompassed. FIG. 6A illustrates a geographic tile 500 with a center point 502 on the downtown map 300 of FIG. 3. The geographic tile 500 is identified by the coordinates (40.761487, −73.988657), (40.7566016, −73.976731). Entities 604 have been retrieved as responses from a third-party server. A bounding perimeter 606 has been calculated based on the entity 604A farthest from the center point 502. Because the bounding perimeter 606 does not encompass the geographic tile 500, there may be entities 609 to associate with the geographic tile 500 that have not been retrieved as responses from third-party servers.

Particular embodiments may divide the geographic tile 500 into a plurality of subdivision tiles and recursively populate each of the subdivision tiles using the methods described above. FIG. 6B illustrates a division wherein the third-party servers are configured to respond with a Nearest Within response. The geographic tile 500 from FIG. 6A has been divided into four subdivision tiles 610 with corresponding center points 612. As an example and not by way of limitation, the geographic tile 500 may be divided into a predetermined number of subdivision tiles 610. As another example, the number of subdivision tiles 610 may be selected based on other information available with respect to the geographic area in question. In particular embodiments, each time a tile is divided, it is divided into four subdivision tiles. Entities 614 may be retrieved as responses from a third-party server for each center point 612. A bounding perimeter 616 may be calculated based on each center point 612. If the third-party server was configured to return a Nearest Within response, the bounding perimeters 616 calculated based on the entities 614A farthest from each center point 612 may have an equal or near equal radius. This may mean that all entities 614 within that radius have been returned. In the example of FIG. 6B, each subdivision tile 610 is encompassed by its respective bounding perimeter 616. If a bounding perimeter 616 is found to encompass a subdivision tile 610, the entities 614 retrieved for that subdivision tile 616 may be associated with the geographic tile 500 and the operation terminated with respect to that subdivision tile 616.

FIG. 6C illustrates a division wherein the third-party servers are configured to respond with a Nearest K response. The geographic tile 500 from FIG. 6A has been divided into four subdivision tiles 620A-620D with corresponding center points 622A-622D. Entities 624A-624D have been retrieved as responses from a third-party server for each center point 622A-622D. Bounding perimeters 626A-626D have been calculated based on each center point 622A-622D and respective farthest entity 624A'-624D'. In the example of FIG. 6C the nearest five entities 624A-624D to each center point 622A-622D have been retrieved as a response from the third-party server. Consequently, the bounding perimeters 626A-626D do not have an equal maximum distance. A bounding perimeter 626D encompasses a subdivision tile 620D so those retrieved entities 624D and 624D' located within that subdivision tile 626D may be stored in association with the geographic tile 500. Some bounding perimeters 626A-626C do not encompass their respective subdivision tiles 620A-620C. If a bounding perimeter 626A-626C is found not to encompass a subdivision tile 620A-620C, then the subdivision tile 620A-620C may in turn be divided and the new subdivision tiles recursively populated. Subdivision tiles 620A-620C will be further subdivided and the operation will continue for each new subdivision tile. Although this disclosure describes and illustrates dividing and recursively populating subdivision tiles in a particular manner, this disclosure contemplates any suitable method for dividing and recursively populating subdivision tiles.

Particular embodiments may request entity information from a plurality of third-party servers in parallel. As an example and not by way of limitation, particular embodiments may use the response from each third-party server to perform an independent maximum distance and bounding perimeter calculation. The geographic tile, and each subsequent subdivision tile, may be divided based solely on the results of a single third-party server. Once the operation has been terminated for all parallel subdivision tiles, the results from each third-party server may be compiled and associated with the geographic tile. This may have the advantage of avoiding redundant requests to third-party servers using subdivision center points after a bounding perimeter has already been found to encompass a geographic tile or subdivision tile. This may be desirable when the third-party servers respond with information of differing degrees of granularity, or when third-party servers are associated with different types of entities. As another example and not by way of limitation, particular embodiments may compile the results of the initial parallel request before determining the maximum distance and bounding perimeter. A response may be requested from each third-party server for every subdivision tile center point. The operation may terminate once a bounding perimeter encompassing each subdivision tile is found using the results of the plurality of third-party servers. Although this disclosure describes and illustrates requesting information from third-party servers in parallel in a particular manner, this disclosure contemplates any suitable method for requesting information from third-party servers.

Particular embodiments may designate terminating conditions with respect to a geographic tile or subdivision tile in addition to a bounding perimeter encompassing the tile in question. In some embodiments, recursively populating subdivision tiles may terminate when a count of the plurality of subdivision tiles exceeds a threshold. The memory resources needed to represent the associated entities grows exponentially with each division. As each subdivision tile is divided and recursively populated, particular embodiments may count the number of subdivision tiles used. When that number exceeds a threshold, some embodiments may stop the dividing process and associate the entities identified for each subdivision tile with the geographic tile.

In some embodiments, recursively populating subdivision tiles may terminate when dividing a subdivision tile or geographic tile would produce subdivision tiles with dimensions below a threshold. As the geographic tile and subdivision tiles are divided and populated, the area of each tile decreases exponentially. It may be desirable to cease dividing a subdivision tile prior to determining a bounding perimeter that encompasses the subdivision tile. With a poorly selected geographic tile, the subdivision tiles produced may contain extreme dimensions making the tiles overly narrow or short. This may have the potential to require a division and population of a large number of subdivision tiles to overcome the extreme dimension. When such a dimension is detected, some embodiments may terminate recursively populating subdivision tiles to allow for identification of a proper subdivision tile.

In some embodiments, recursively populating subdivision tiles may terminate when the count of divisions applied to a subdivision tile or geographic tile exceeds a threshold. As the geographic tile or subdivision tiles are divided, the tile being divided may be designated as the parent tile, with the resulting tiles being designated the children tiles. Each parent-child relationship may represent a generation of divisions. The count of generations of divisions may represent the number of times a particular subdivision tile has been divided. Each division may require an at-least quadratic increase in the amount of memory storage required to represent each subdivision tile. If a sufficiently large geographic tile is identified, it may require a large number of generations to exhaustively populate and may exceed available memory resources. When a large enough count of divisions is detected, some embodiments may terminate recursively populating subdivision tiles.

In some embodiments, the above thresholds may be determined based on a plurality of factors. These factors may include: an entity type associated with the third-party server that supplied the entities; an entity type associated with the entities; a degree of precision for entity location information, such as the degree of precision of latitude and longitude coordinates, provided by the third-party server that supplied the entities; a value provided by the third-party server through an Application Programming Interface or other appropriate means; or using any other suitable information for determining how to avoid unnecessary requests for entities from third-party servers. A third-party server may provide as part of its Application Program Interface a value representing the degree of precision that may be anticipated when making requests to the third-party server. This value may be used by particular embodiments to determine when a request for entities would not result in retrieving additional useful information. Although this disclosure describes and illustrates identifying terminating conditions in a particular manner, this disclosure contemplates any suitable method for identifying terminating conditions.

Figure 7A:
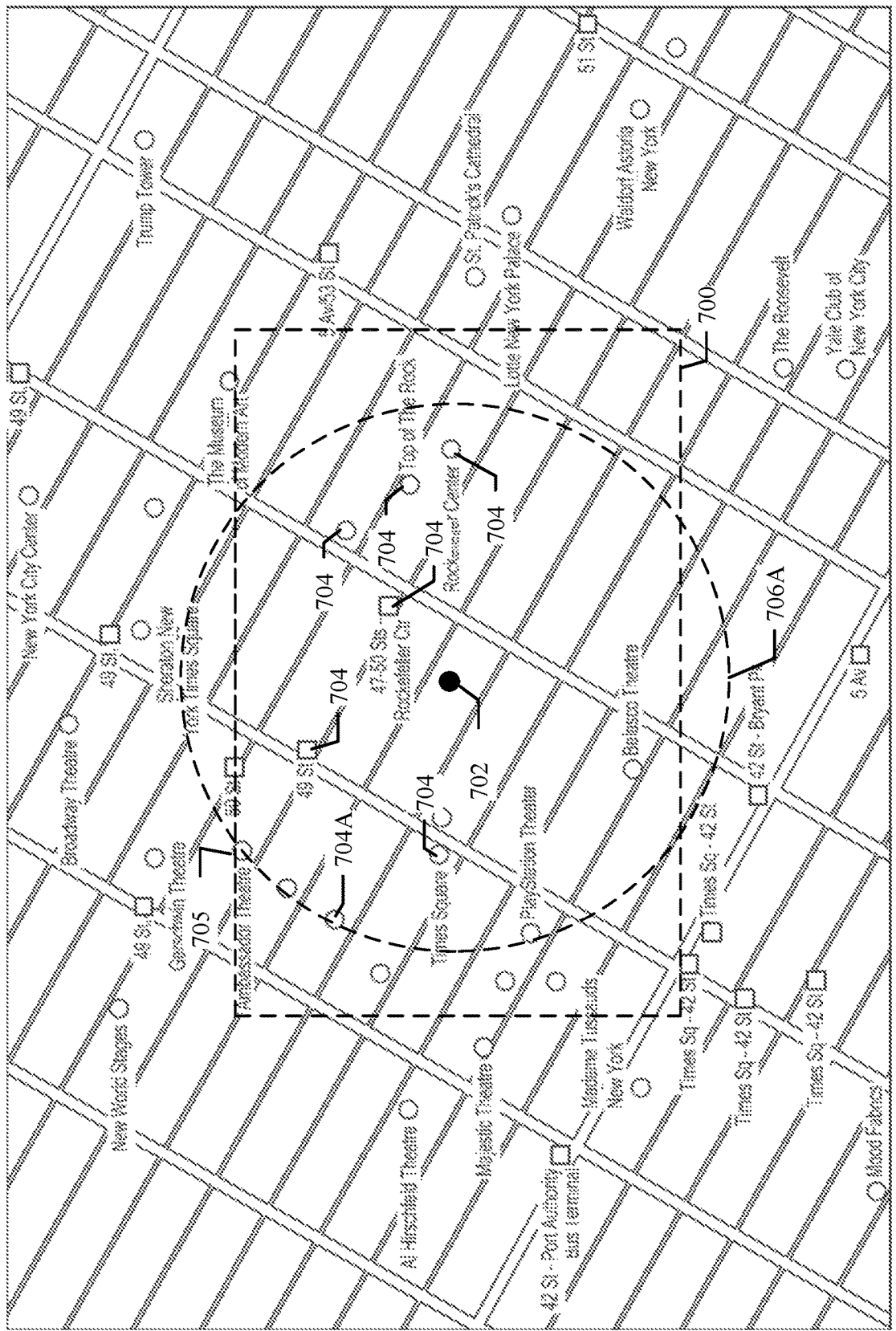
FIGS. 7A-7B illustrate an example set of mapped entities within a specified radius of a point on the map of FIG. 4
Figure 7B:
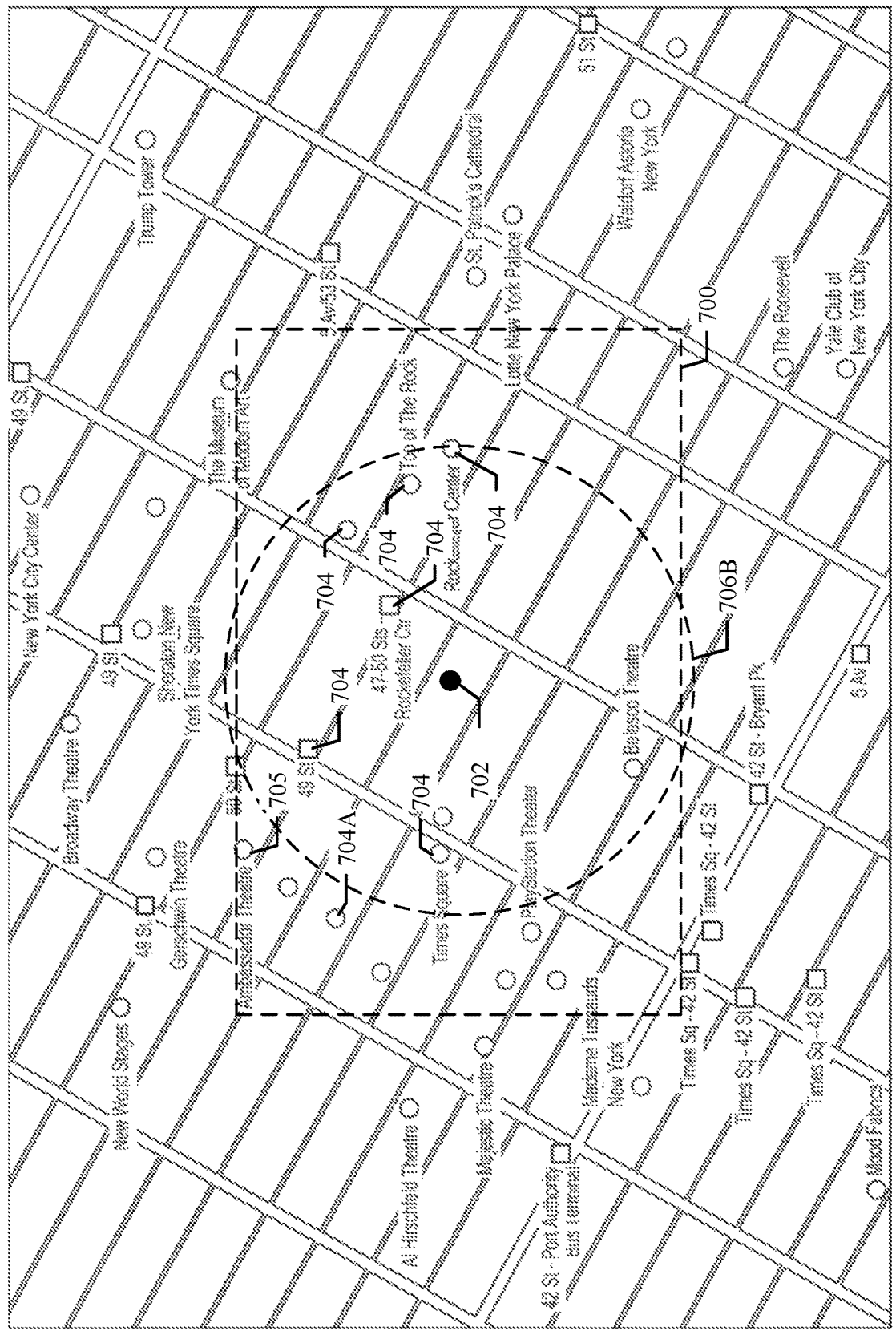

FIG. 7A-7B illustrate a scenario in which an entity is located close to the edge of a geographic tile. In FIG. 7A, a geographic tile 700 of the map 300 has been identified for population. Entities 704 have been retrieved from a third-party server based on the center point 702. A bounding perimeter 706A has been calculated based on the farthest entity 704A from the center point 702. Particular embodiments may be configured to determine if the location information associated with an entity 705 causes it to be positioned close to the edge of a geographic tile 700 or subdivision tile. Particular embodiments may be configured with a degree of error, denoted epsilon. If the distance between the edge of the geographic tile and the entity is less than epsilon, particular embodiments may be configured to respond by adjusting the maximum distance. In some embodiments, the value for epsilon may be determined in advance. In some embodiments the value for epsilon may be determined based on information received from the third-party server. As an example and not by way of limitation, particular embodiments may be configured to decrease the maximum distance, causing results to be under inclusive. Because the maximum distance is the radius of the bounding perimeter 706A, decreasing the maximum distance may have the effect of decreasing the area within the bounding perimeter 706A and decreasing the number of entities 704 included within the bounding perimeter 706A. This may cause the geographic tile 700 or subdivision tile to be divided, ensuring that all available entities 704 are associated with the geographic tile. FIG. 7B illustrates the effect of decreasing the maximum distance. The maximum distance has been decreased and the bounding perimeter 706B has been recalculated. The bounding perimeter 706B no longer coincides with the distance of the previous entity 704A farthest from the center point 702. The bounding perimeter 706B now clearly fails to include the entity 705 determined to be a distance less than epsilon from the edge of the geographic tile 700. As a consequence, the bounding perimeter 706B now clearly fails to encompass the geographic tile 700. Particular embodiments may be configured to decrease the maximum distance by the distance between the edge of the geographic tile or subdivision tile and the entity, by epsilon or some other fixed amount, or by another amount. Particular embodiments may be configured to increase the maximum distance, causing results to be over inclusive, but allowing the operation to terminate more quickly. In particular embodiments the dimensions of the geographic or subdivision tile may be contracted or expanded to be under or over inclusive. Although this disclosure describes and illustrates including or excluding an entity close to the edge of a geographic or subdivision tile in a particular manner, this disclosure contemplates any suitable method for including or excluding an entity close to the edge of a geographic or subdivision tile.

Figure 8:
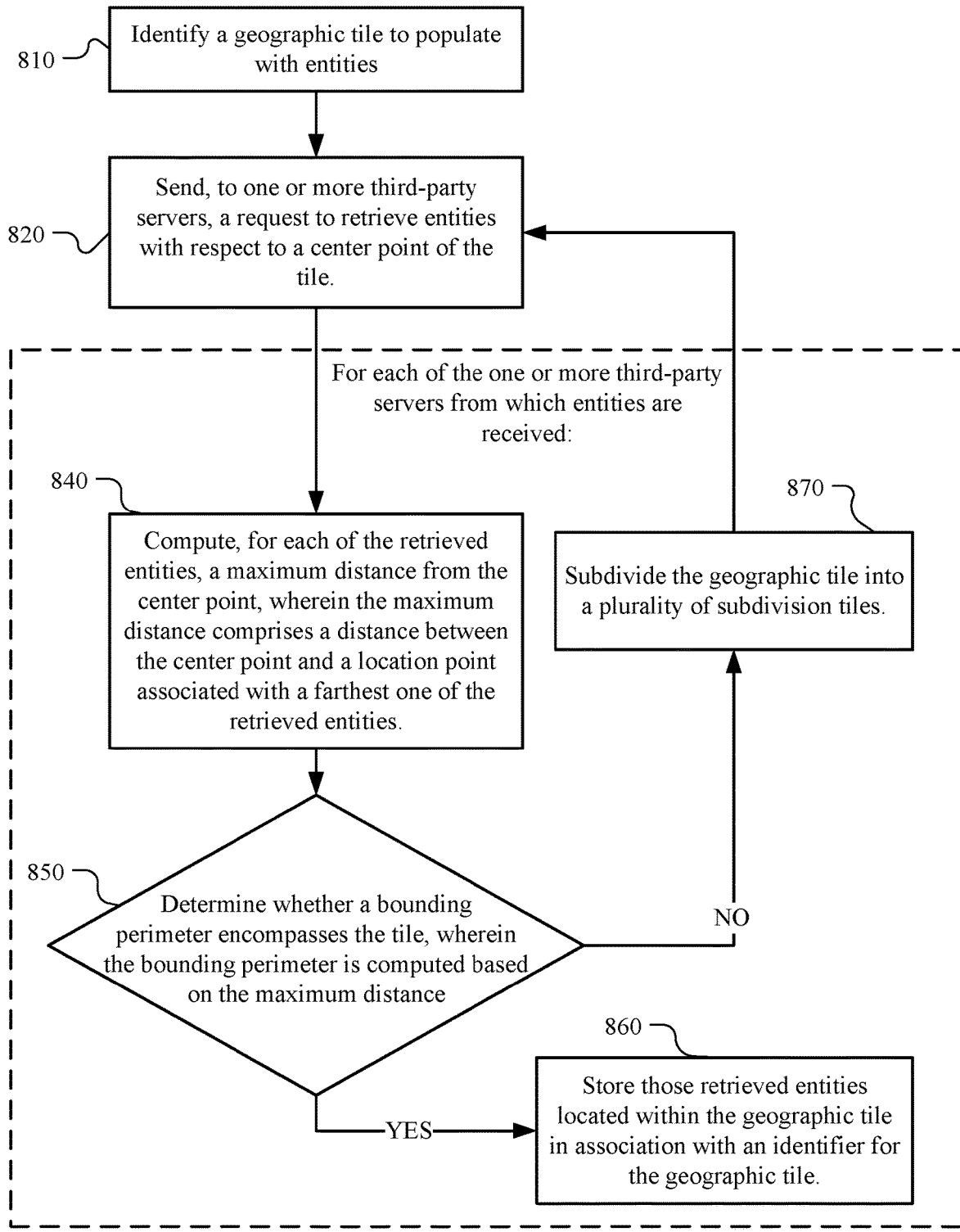
FIG. 8 illustrates an example method for exhaustive places fetching.

FIG. 8 illustrates an example method 800 for exhaustively fetching places provided by a third-party server. The method may begin at step 810 where a geographic tile 500 is identified to populate with entities 504. A center point 502 may be calculated. At step 820 a request may be sent to one or more third-party servers for entities 504 near the center point 502. For each third-party server from which entities 504 are received, at step 840, the maximum distance may be calculated. At step 850, particular embodiments may determine whether a bounding perimeter 506 based on the maximum distance encompasses the geographic tile. If not, at step 870, the geographic tile 500 may be subdivided into a plurality of subdivision tiles 610. For each subdivision tile, at step 820 a center point 612 may be calculated and a request may be sent to one or more third-party servers for entities 614 near center point 612. For each third-party server from which entities 614 are received, steps 840 and 850 may be performed as described. If the bounding perimeter 616 is found to encompass the subdivision tile, at step 860 those retrieved entities located within the geographic tile 614 may be stored in association with the geographic tile 500 and the operation may terminate. If a bounding perimeter 616 does not encompass the subdivision tile 610, the subdivision tile 610 may be further divided and the operation may continue. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for exhaustive places fetching including the particular steps of the method of FIG. 8, this disclosure contemplates any suitable method for exhaustive places fetching including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web interfaces, in one or more e-mails, or in connection with search results requested by a user. In addition or as an alternative, an advertisement may be one or more sponsored stories (e.g., a news-feed or ticker item on the social-networking system 160). A sponsored story may be a social action by a user (such as "liking" an interface, "liking" or commenting on a post on an interface, RSVPing to an event associated with an interface, voting on a question posted on an interface, checking in to a place, using an application or playing a game, or "liking" or sharing a website) that an advertiser promotes, for example, by having the social action presented within a pre-determined area of a profile interface of a user or other interface, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results interface, where sponsored content is promoted over non-sponsored content.

In particular embodiments, an advertisement may be requested for display within social-networking-system web interfaces, third-party web interfaces, or other interfaces. An advertisement may be displayed in a dedicated portion of an interface, such as in a banner area at the top of the interface, in a column at the side of the interface, in a GUI within the interface, in a pop-up window, in a drop-down menu, in an input field of the interface, over the top of content of the interface, or elsewhere with respect to the interface. In addition or as an alternative, an advertisement may be displayed within an application. An advertisement may be displayed within dedicated interfaces, requiring the user to interact with or watch the advertisement before the user may access an interface or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) an interface associated with the advertisement. At the interface associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node #04 corresponding to a particular photo may have a privacy setting specifying that the photo may only be accessed by users tagged in the photo and their friends. In particular embodiments, privacy settings may allow users to opt in or opt out of having their actions logged by social-networking system &60 or shared with other systems (e.g., third-party system &70). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems &70, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers &62 may be authorization/privacy servers for enforcing privacy settings. In response to a request from a user (or other entity)

for a particular object stored in a data store &64, social-networking system &60 may send a request to the data store &64 for the object. The request may identify the user associated with the request and may only be sent to the user (or a client system &30 of the user) if the authorization server determines that the user is authorized to access the object based on the privacy settings associated with the object. If the requesting user is not authorized to access the object, the authorization server may prevent the requested object from being retrieved from the data store &64, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 9:
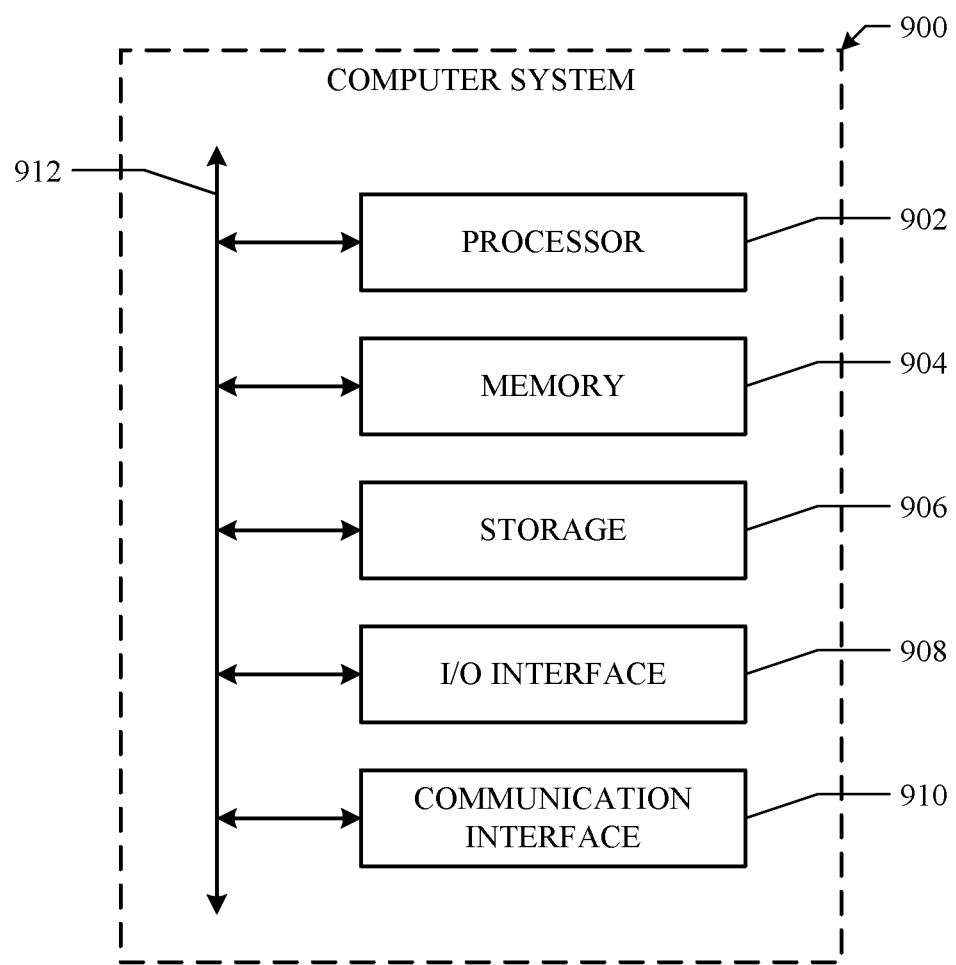
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computer server machines:
    identifying a geographic tile to populate with entities; and
    populating the geographic tile with entities from third-party servers, wherein the populating comprises:
        sending, to one or more third-party servers, a request to retrieve entities with respect to a center point of the geographic tile; and
        for each of the one or more third-party servers for which a response with retrieved entities is received:
            in response to receiving the retrieved entities, computing a maximum distance from the center point of the geographic tile to a location point associated with a farthest one of the retrieved entities;
            determining whether a bounding perimeter computed based on the maximum distance encompasses the geographic tile; and
            if the bounding perimeter encompasses the geographic tile, storing the retrieved entities in association with an identifier for the geographic tile, wherein the bounding perimeter encompassing the geographic tile indicates that the retrieval is exhaustive;
            else:
                subdividing the geographic tile into a plurality of subdivision tiles;
                recursively populating each of the subdivision tiles with retrieved entities from third-party servers; and
                storing the retrieved entities in association with an identifier for each of the recursively populated subdivision tiles.

2. The method of claim 1, wherein the geographic tile is identified based on geographic coordinates on a map.

3. The method of claim 2, wherein the geographic coordinates comprise at least two pairs of latitude and longitude coordinates.

4. The method of claim 1, wherein the third-party server provides, for each of the retrieved entities, location information associated with the entity, and wherein the location information comprises at least one location point corresponding to a pair of latitude and longitude coordinates.

5. The method of claim 1, wherein the third-party server provides, for each of the retrieved entities, location information associated with the entity, and wherein the location information comprises a plurality of location points, determining a representative location point based on:
    an average of the plurality of location points;
    a median of the plurality of location points; or
    a closest of the plurality of location point to the center point.

6. The method of claim 1, wherein the sending the request to retrieve the entities comprises:
    sending an initial request for entities to each of a plurality of third-party servers in parallel, wherein the stored entities comprise final results retrieved from each of the third-party servers, wherein the final results include entities retrieved by population of any subdivision tiles.

7. The method of claim 1, wherein the recursively populating each of the subdivision tiles terminates when a count of the plurality of subdivision tiles exceeds a threshold.

8. The method of claim 7, wherein the threshold is determined based on:
    an entity type associated with the third-party server;
    an entity type associated with the retrieved entities;
    a degree of precision for latitude and longitude coordinates provided by the third-party server; or
    a value provided by the third-party server.

9. The method of claim 1, wherein the recursively populating each of the subdivision tiles terminates when a dimension of the subdivision tile is below a threshold.

10. The method of claim 9, wherein the threshold is determined based on:
    an entity type associated with the third-party server;
    an entity type associated with the retrieved entities;
    a degree of precision for latitude and longitude coordinates provided by the third-party server; or
    a value provided by the third-party server.

11. The method of claim 1, wherein the recursively populating each of the subdivision tiles terminates when a count of the recursive divisions applied to a subdivision tile exceeds a threshold.

12. The method of claim 11, wherein the threshold is determined based on:
    an entity type associated with the third-party server;
    an entity type associated with the retrieved entities;
    a degree of precision for latitude and longitude coordinates provided by the third-party server; or
    a value provided by the third-party server.

13. The method of claim 1, wherein the computing for each of the retrieved entities a maximum distance from the center point further comprises:
    if a distance between an edge of the geographic tile and the location point associated with the farthest one of the retrieved entities is below a threshold, then the maximum distance is modified.

14. One or more computer-readable non-transitory storage media embodying software that is operable when executed to:
    identify a geographic tile to populate with entities; and
    populate the geographic tile with entities from third-party servers, wherein the populating comprises:
        sending, to one or more third-party servers, a request to retrieve entities with respect to a center point of the geographic tile; and
        for each of the one or more third-party servers for which a response with retrieved entities is received:
            in response to receiving the retrieved entities, computing a maximum distance from the center point of the geographic tile to a location point associated with a farthest one of the retrieved entities;

determining whether a bounding perimeter computed based on the maximum distance encompasses the geographic tile; and if the bounding perimeter encompasses the geographic tile, storing the retrieved entities in association with an identifier for the geographic tile, wherein the bounding perimeter encompassing the geographic tile indicates that the retrieval is exhaustive;

else:

subdividing the geographic tile into a plurality of subdivision tiles; and recursively populating each of the subdivision tiles with retrieved entities from third-party servers; and storing the retrieved entities in association with an identifier for each of the recursively populated subdivision tiles.

15. The media of claim 14, wherein the geographic tile is identified based on geographic coordinates on a map.

16. The media of claim 15, wherein the geographic coordinates comprise at least two pairs of latitude and longitude coordinates.

17. The media of claim 14, wherein the third-party server provides, for each of the retrieved entities, location information associated with the entity, and wherein the location information comprises at least one location point corresponding to a pair of latitude and longitude coordinates.

18. The media of claim 14, wherein the third-party server provides, for each of the retrieved entities, location information associated with the entity, and wherein the location information comprises a plurality of location points, determining a representative location point based on:

an average of the plurality of location points;

a median of the plurality of location points; or a closest of the plurality of location point to the center point.

19. The media of claim 14, wherein the sending the request to retrieve the entities comprises:

sending an initial request for entities to each of a plurality of third-party servers in parallel, wherein the stored entities comprise final results retrieved from each of the third-party servers, wherein the final results include entities retrieved by population of any subdivision tiles.

20. A system comprising: one or more processors; and a non-transitory memory coupled to the processors comprising instructions executable by the processors, the processor operable when executing the instructions to:

identify a geographic tile to populate with entities; and populate the geographic tile with entities from third-party servers, wherein the populating comprises:

sending, to one or more third-party servers, a request to retrieve entities with respect to a center point of the geographic tile; and for each of the one or more third-party servers for which a response with retrieved entities is received:

in response to receiving the retrieved entities, computing a maximum distance from the center point of the geographic tile to a location point associated with a farthest one of the retrieved entities;

determining whether a bounding perimeter computed based on the maximum distance encompasses the geographic tile; and if the bounding perimeter encompasses the geographic tile, storing the retrieved entities in association with an identifier for the geographic tile, wherein the bounding perimeter encompassing the geographic tile indicates that the retrieval is exhaustive;

else:

subdividing the geographic tile into a plurality of subdivision tiles; and recursively populating each of the subdivision tiles with retrieved entities from third-party servers; and storing the retrieved entities in association with an identifier for each of the recursively populated subdivision tiles.

* * * * *